United States Patent [19]

Hundertmark

[11] Patent Number: 4,512,292
[45] Date of Patent: Apr. 23, 1985

[54] ACCESSORY GEAR DRIVE FOR A TWO-CYCLE ENGINE

[75] Inventor: James M. Hundertmark, Fond du Lac, Wis.

[73] Assignee: Brunswick Corporation, Skokie, Ill.

[21] Appl. No.: 563,326

[22] Filed: Dec. 19, 1983

[51] Int. Cl.³ .............................................. F16H 55/06
[52] U.S. Cl. ................................ 123/65 B; 123/70 R; 123/73 AD; 123/197 AC; 123/196 W; 123/198 C; 74/15.63; 74/DIG. 10
[58] Field of Search ............... 123/65 B, 65 BA, 70 R, 123/72, 73 AD, 195 R, 195 A, 197 AC, 196 W, 198 C, 41.47, 41.46; 74/12, 425, 15.63, DIG. 10

[56] References Cited

U.S. PATENT DOCUMENTS 2,725,863 12/1955 Sanders ............................ 123/195 R
3,457,234 7/1969 Gianatasio ..................... 74/DIG. 10
4,031,877 6/1977 Fujikawa et al. ................ 123/198 C
4,326,849 4/1982 Van Zijderveld ............ 74/DIG. 10
4,372,258 2/1983 Iwai .................................. 123/196 W
4,433,964 2/1984 Holtzberg et al. ............... 123/90.31

OTHER PUBLICATIONS

Norman M. Lloyd, Plastics in the Automotive Industries, Apr. 1, 1961, pp. 47–52.

Primary Examiner—Craig R. Feinberg
Assistant Examiner—David A. Okonsky
Attorney, Agent, or Firm—O. T. Sessions

[57] ABSTRACT

A gear drive for driving accessories such as an oil pump for a two-cycle engine (10) includes a worm member (25) mounted on the crankshaft (14) of the engine. The worm member (25), formed of a low friction plastic material such as nylon impregnated with molybdenum disulfide, engages a worm gear (24) mounted on the engine (10) to drive the oil pump (21).

12 Claims, 3 Drawing Figures

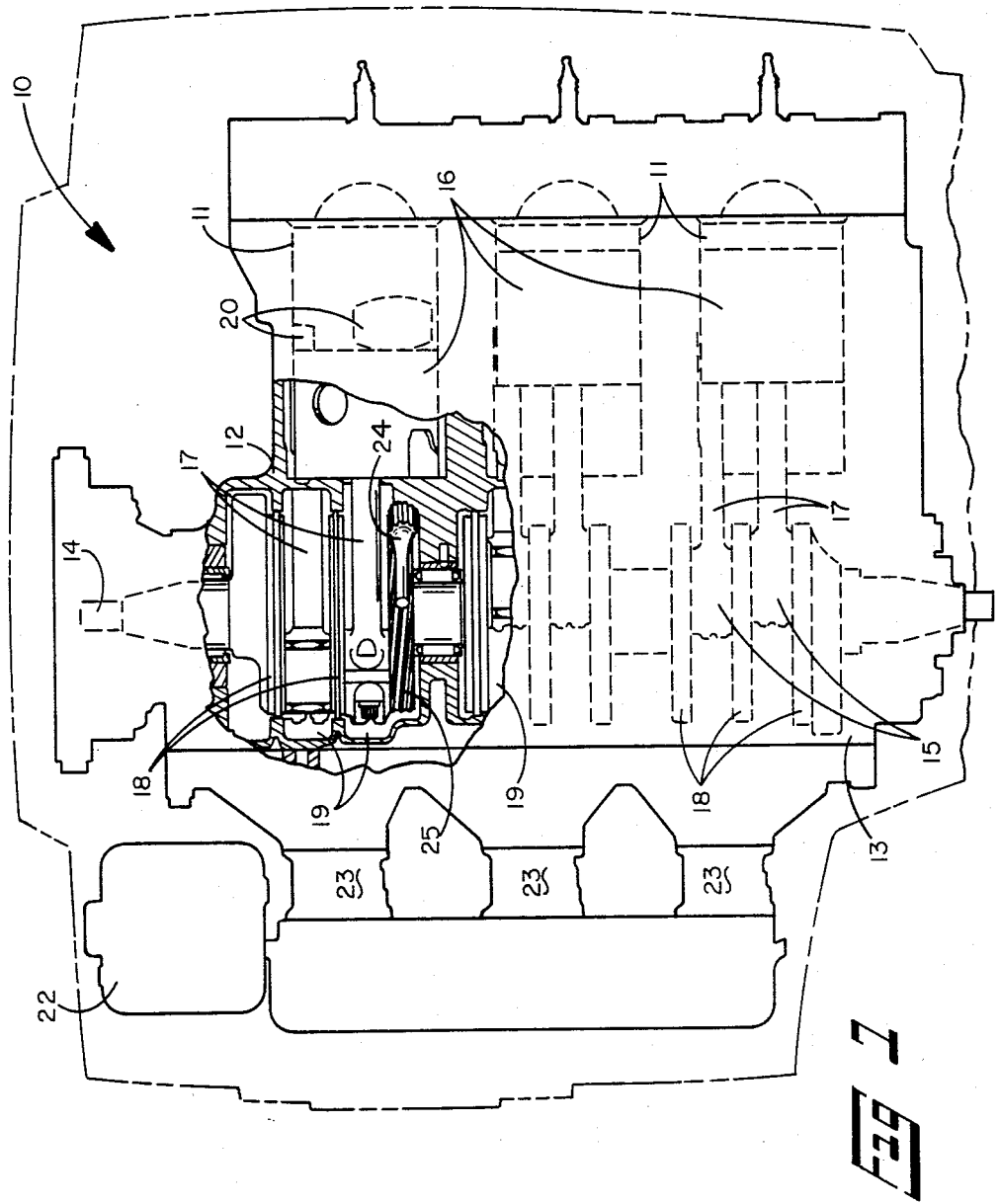

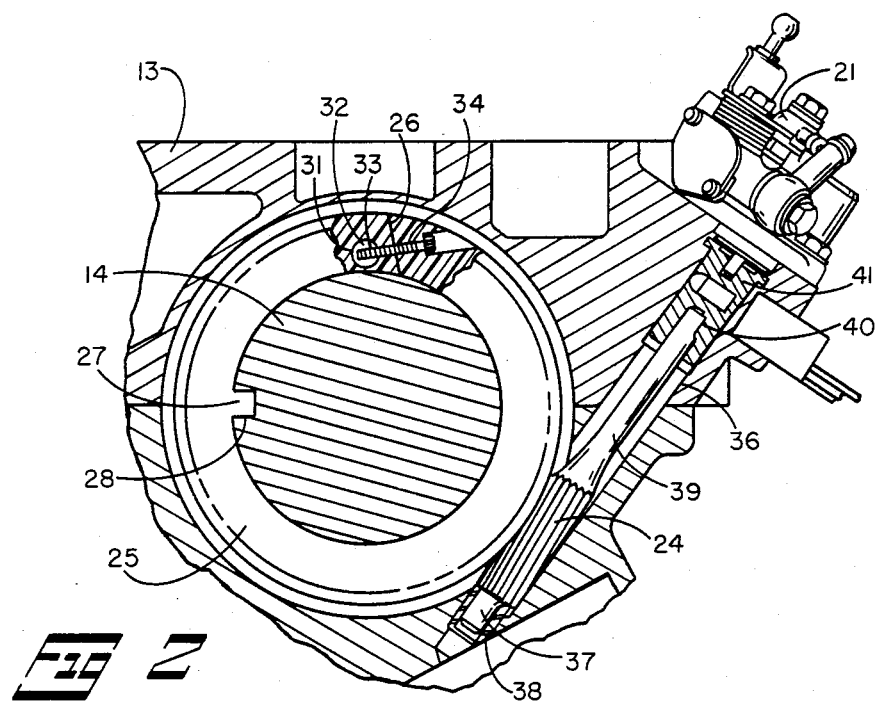
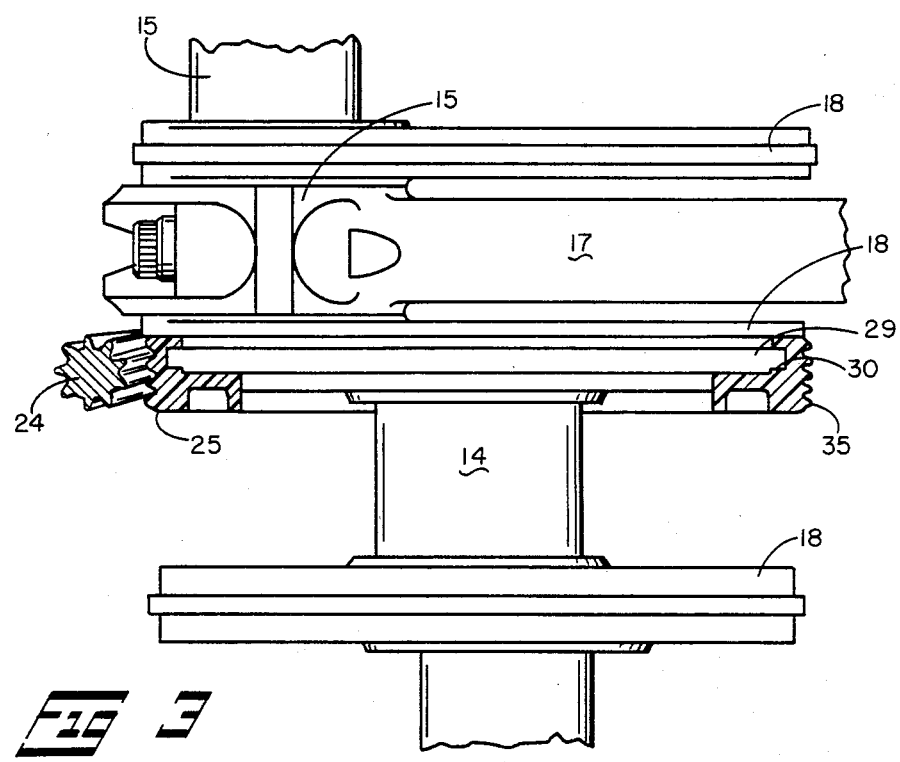

ACCESSORY GEAR DRIVE FOR A TWO-CYCLE ENGINE

DESCRIPTION

1. Technical Field

This invention relates to two-cycle internal combustion engine and particularly to gearing for driving accessories.

2. Background Art

Prior two-cycle engines such as those disclosed in U.S. Pat. No. 3,765,393 to Pipes, issued on Oct. 16, 1973, and U.S. Pat. No. 4,372,258 to Iwai, issued on Feb. 8, 1983 have disclosed worm gears on the engine crankshaft to drive accessories. In the prior systems the worm has been formed as part of the crankshaft and lubrication of the worm and the worm gear has been critical to prevent early failure of the gearing.

DISCLOSURE OF INVENTION

The invention provides a two-cycle crankcase compression engine having a cylinder block including a cylinder. A crankcase member defines with the cylinder block a crankcase and a crankshaft is mounted for rotation in the crankcase. A piston is mounted for reciprocation in the cylinder and is connected to be driven by the crankshaft. An intake means is provided to admit lubricating oil and a combustible mixture to the crankcase. A worm member formed of a low-friction plastic material and having a helical tooth is attached to the crankshaft and drives a worm gear mounted on the engine in engagement with the helical tooth.

The plastic of which the worm member is formed can be a plastic resin filled with a lubricating material. Nylon impregnated with molybdenum disulfide has proven particularly satisfactory.

Preferably the worm member has the form of a split annulus and further includes an attachment means for attaching the ends of the worm member together around the crankshaft. The engine crankshaft can include a circumferential flange and the worm member can include a circumferential groove mating with the flange to restrain the worm member from axial movement.

The invention is particularly suitable for driving an oil pump for supplying lubricating oil to the crankcase of the two-cycle engine.

BRIEF DESCRIPTION OF THE DRAWINGS

FIG. 1 is an elevational view of an outboard motor engine broken away to show details of the crankshaft.

FIG. 2 is view taken along the line 2—2 of FIG. 1.

FIG. 3 is a sectional view in elevation taking along line 3—3 of FIG. 2.

DETAILED DESCRIPTION OF THE PREFERRED EMBODIMENT

Referring to FIG. 1 a two-cycle crankcase compression engine 10 suitable for use on an outboard motor is illustrated. The particular engine illustrated has six cylinders 11 arranged in a V, though other cylinder arrangements could be utilized with the invention as well.

The engine 10 includes a crankcase defined between the forward end of the cylinder block 12 and a crankcase member 13. A crankshaft 14 is mounted for rotation about a normally vertical axis in the crankcase and has six crank throws 15, each connected to a piston 16 by a connecting rod 17 in a conventional manner. The crank throws 15 are supported by circular crankshaft cheeks 18 which also serve to divide the crankcase into six crankcase compartments 19, one for each corresponding cylinder 11. Each crankcase compartment is connected to transfer ports 20 in the corresponding cylinder by transfer passages, not illustrated.

An oil pump 21 is provided to supply lubricating oil from a reservoir 22 to mix with the fuel prior to its introduction into the carburetors 23 in a manner like that shown in U.S. Pat. No. 4,388,896 to Sheridan et al, issued on June 21, 1983. The conventional oil pump 21 is driven by a worm gear 24 which in turn is driven by a worm 25 mounted on one of the crankshaft cheeks 18.

The oil from the pump 21 is mixed with the fuel and supplied to the crankcase compartments 19 through an induction system which includes carburetors and reed valves not illustrated for admitting an air fuel mixture to the crankcase compartments 19. In the crankcase compartments 19 the oil seves as a lubricant for the crankshaft 14, connecting rods 17, and pistons 16.

The worm 25 is formed as a split ring to allow it to be mounted on the crankshaft 14. Referring to FIG. 2 the worm member 25 is split along a diagonal cut 26 to allow it to be placed on the crankshaft 14. The worm 25 must be sufficiently flexible to allow it to be spread apart and mounted on the crankshaft 14. The worm member 25 includes a radial projection 27 extending inward to engage a corresponding indentation 28 in the crankshaft check 18. The radial projection 27 assures that the worm 25 will rotate with the crankshaft 14. A circumferential flange 29 formed on the crankshaft 14 extends around the crankshaft cheek 18 as shown in FIG. 3 and engages a corresponding circumferential groove 30 in the worm member 25 to restrain the worm member 25 from axial movement. An axial hole 31 through the worm member 25 adjacent to the cut 26 houses a lock barrel 32 which includes a threaded bore 33. A retaining screw 34 is provided to close the worm member 25 around the crankshaft 14. The retaining screw 34 extends through the worm member 25 across the cut 26, and engages the screw threads in the lock barrel 32. Four helical teeth 35 are provided on the external circumference of the worm member 25 to drive the worm gear 24.

A bore 36 through the crankcase member 13 and into the cylinder block 12 houses the worm gear 24. A cylindrical projection 37 at the end of the worm gear 24 is mounted in a bushing 38 in the bottom of the bore 36 in the cylinder block 12 to support the worm gear 24 for rotation. A shaft 39 formed integrally with the worm gear 24 extends outwardly towards the oil pump 21, and has a flat side 40 at the end to mate with a correspondingly shaped coupler bushing 41 to support the outer end of the worm gear 24. The bushing 41 is coupled directly to drive the oil pump 21.

The worm member 25 is molded of a low-friction plastic material, preferably nylon II impregnated with molybdenum disulfide, while the worm gear 24 is machined steel. Because of the lubricated nature of the material forming the worm member, no special provisions are necessary for lubricating the worm member 25 and worm gear 24. Sufficient lubrication for the meshing gears is provided by the simple expedient of mounting the worm member 25 on one of the lower cheeks 18 in a crankcase compartment so that the normal accumulation of oil in the compartment 19 provides lubrication.

I claim:

1. A two-cycle crankcase compression engine comprising:
   (A) a cylinder block having a cylinder;
   (B) a crankcase member defining with said cylinder block a crankcase;
   (C) a crankshaft mounted for rotation in said crankcase;
   (D) a piston means mounted for reciprocation in said cylinder and coonnected to said crankshaft;
   (E) an intake means for admitting lubrication oil and a combustible mixture to said crankcase;
   (F) a worm member mounted on said crankshaft inside said crankcase, said worm member formed of a low friction plastic material and having a helical tooth; and
   (G) a worm gear mounted on said engine in engagement with said helical tooth.

2. The engine defined in claim 1 wherein said low friction plastic material is a plastic resin filled with a lubricating material.

3. The engine defined in claim 2 wherein said plastic resin is a nylon and said lubricating material includes molybdenum disulfide.

4. The engine defined in claim 1 wherein said worm member is a single piece and has the form of a split annular ring and further including an attachment means for attaching the ends of said worm member together.

5. The engine in claim 4 wherein one of said crankshaft and said worm member includes a circumferential flange and the other of said crankshaft and said worm member includes a circumferential groove mating with said flange to restrain said worm member from axial movement.

6. A two-cycle crankcase compression engine comprising:
   (A) a cylinder block including a plurality of cylinders;
   (B) a crankcase member defining with said cylinder block a crankcase having an upper and a lower crankcase compartment;
   (C) a crankshaft mounted for rotation in said crankcase, said crankshaft extending through both of said crankcase compartments;
   (D) pistons mounted in each of said cylinders and connected to said crankshaft;
   (E) an intake means for admitting lubricating oil and a combustible mixture to said crankcase compartments;
   (F) a seal means surrounding said crankshaft between said crankcase compartments;
   (G) a worm member formed of a low friction plastic material and attached to said crankshaft between said crankcase compartments above said seal means, said worm member having the form of a split ring to allow assembly on the crankshaft and having a helical tooth around its periphery;
   (H) a worm gear mounted on said engine in engagement with said helical tooth.

7. The engine defined in claim 6 wherein said worm member is a single piece and further including an attachment means for attaching the ends of said worm member together.

8. The engine defined in claim 6 wherein said low friction material is a plastic resin filled with a lubricating material.

9. The engine defined in claim 8 wherein said worm gear is formed of a metal.

10. The engine defined in claim 9 wherein said crankshaft includes a flange and said worm member includes a mating groove to restrain said worm member from axial movement.

11. A two-cycle crankcase compression engine comprising:
    (A) a cylinder block having a cylinder;
    (B) a crankcase member defining with said cylinder block a crankcase;
    (C) a crankshaft mounted for rotation in said crankcase and including a circumferential flange;
    (D) a piston means mounted for reciprocation in said cylinder and connected to said crankshaft;
    (E) an intake means for admitting lubrication oil and a combustible mixture to said crankcase;
    (F) a worm member attached to said crankshaft, said worm member formed of a low friction plastic material and having a helical tooth, said worm member having the form of a split annular ring and including a circumferential groove mating with said flange to restrain said worm member from axial movement;
    (G) an attachment means for attaching the ends of said worm member together; and
    (H) a worm gear mounted on said engine in engagement with said helical tooth.

12. The engine defined in claim 11 wherein said crankshaft includes a radial indentation and said worm member includes a radial projection engaging said indentation to prevent relative rotation between said worm member and said crankshaft.

* * * * *